United States Patent
Bull et al.

(10) Patent No.: US 11,158,943 B2
(45) Date of Patent: *Oct. 26, 2021

(54) WIRELESS COMMUNICATION TERMINAL

(71) Applicant: IRIDIUM SATELLITE LLC, McLean, VA (US)

(72) Inventors: Jeffrey Francis Bull, Chalfont, PA (US); Alden Joe Fuchs, Leesburg, VA (US); Charles Howard Woloszynski, Vienna, VA (US)

(73) Assignee: Iridium Satellite LLC, McLean, VA (US)

( * ) Notice: Subject to any disclaimer, the term of this patent is extended or adjusted under 35 U.S.C. 154(b) by 633 days.

This patent is subject to a terminal disclaimer.

(21) Appl. No.: 15/863,478

(22) Filed: Jan. 5, 2018

(65) Prior Publication Data
US 2018/0145408 A1     May 24, 2018

Related U.S. Application Data

(63) Continuation of application No. 14/494,797, filed on Sep. 24, 2014, now Pat. No. 9,882,279.

(51) Int. Cl.
| | |
|---|---|
| *H04B 7/00* | (2006.01) |
| *H01Q 3/34* | (2006.01) |
| *H04W 16/28* | (2009.01) |
| *H04B 7/06* | (2006.01) |
| *H01Q 3/26* | (2006.01) |
| *H01Q 3/22* | (2006.01) |

(Continued)

(52) U.S. Cl.
CPC ............. *H01Q 3/34* (2013.01); *H04B 7/0617* (2013.01); *H04W 16/28* (2013.01); *H01Q 3/22* (2013.01); *H01Q 3/26* (2013.01); *H01Q 3/36* (2013.01); *H04B 17/18* (2015.01)

(58) Field of Classification Search
CPC .. H01Q 3/34; H01Q 3/26; H01Q 3/22; H01Q 3/36; H04B 7/0617; H04B 17/18; H04W 16/28
USPC .......................... 342/367, 354, 368, 371, 372
See application file for complete search history.

(56) References Cited

U.S. PATENT DOCUMENTS

| | | | | |
|---|---|---|---|---|
| 4,639,732 A | * | 1/1987 | Acoraci | H01Q 3/267 342/165 |
| 4,949,090 A | * | 8/1990 | Tamii | H01Q 3/267 342/173 |

(Continued)

OTHER PUBLICATIONS

"Smart Antenna", from Wikipedia, retrieved on Mar. 27, 2014 from http://en.wikipedia.org/w/index.php? title=Smart_antenna&oldid=583789003.

(Continued)

*Primary Examiner* — Chuong P Nguyen
(74) *Attorney, Agent, or Firm* — Baker Botts L.L.P.

(57) ABSTRACT

In one implementation, an antenna array has a plurality of antenna element, each of which is configured to apply a phase shift to a signal. A beam steering controller is configured to steer a main beam of the antenna by controlling the phase shifts applied by the antenna elements. In addition, the beam steering controller also is configured to detect a failure of an antenna element and, in response to detecting the failure, disable the failed antenna element and modify the phase shifts applied by remaining ones of the antenna elements.

12 Claims, 5 Drawing Sheets

(51) Int. Cl.
*H01Q 3/36* (2006.01)
*H04B 17/18* (2015.01)

(56) References Cited

U.S. PATENT DOCUMENTS

| | | | | |
|---|---|---|---|---|
| 5,008,680 | A * | 4/1991 | Willey | H01Q 3/26 |
| | | | | 342/372 |
| 5,083,131 | A | 1/1992 | Julian | |
| 5,086,302 | A | 2/1992 | Miller | |
| 5,122,806 | A | 6/1992 | Julian | |
| 6,018,644 | A | 1/2000 | Minarik | |
| 6,084,541 | A | 7/2000 | Sayegh | |
| 6,140,976 | A | 10/2000 | Locke et al. | |
| 6,157,340 | A | 12/2000 | Xu et al. | |
| 6,307,507 | B1 * | 10/2001 | Gross | H01Q 1/288 |
| | | | | 342/354 |
| 6,339,398 | B1 | 1/2002 | Redvik | |
| 7,071,873 | B2 | 7/2006 | Tomasic et al. | |
| 7,312,750 | B2 * | 12/2007 | Mao | H01Q 3/2605 |
| | | | | 342/373 |
| 7,728,769 | B2 * | 6/2010 | Chang | G01S 7/414 |
| | | | | 342/360 |
| 7,990,316 | B2 * | 8/2011 | Cock | H01Q 3/245 |
| | | | | 342/372 |
| 8,049,661 | B1 * | 11/2011 | Loberger | H01Q 3/267 |
| | | | | 342/173 |
| 8,903,017 | B2 * | 12/2014 | Zatman | H04L 27/04 |
| | | | | 375/300 |
| 8,907,845 | B2 | 12/2014 | Jones | |
| 8,941,553 | B1 * | 1/2015 | Pochop, Jr. | H01Q 1/48 |
| | | | | 343/876 |
| 9,140,779 | B2 | 9/2015 | Smits et al. | |
| 10,924,164 | B2 * | 2/2021 | Brunel | H04B 7/0617 |
| 2003/0001668 | A1 | 1/2003 | Mruz et al. | |
| 2004/0085933 | A1 * | 5/2004 | Wang | H01Q 3/42 |
| | | | | 370/334 |
| 2004/0087294 | A1 * | 5/2004 | Wang | H04B 7/0671 |
| | | | | 455/276.1 |
| 2006/0154667 | A1 * | 7/2006 | Seo | H04W 16/00 |
| | | | | 455/446 |
| 2011/0241941 | A1 | 10/2011 | Krich et al. | |
| 2014/0097986 | A1 | 4/2014 | Xue et al. | |

OTHER PUBLICATIONS

"Beamforming—Wikipedia, the free encyclopedia", http://en.wikipedia.org/wiki/Beam_forming (last visited Jul. 10, 2014).
"Main lobe—Wikipedia, the free encyclopedia", http://en.wikipedia.org/wiki/Main_lobe (last visited Jul. 15, 2014).
"Phased array—Wikipedia, the free encyclopedia", http://en.wikipedia.org/wiki/Phased_array (last visited Jul. 9, 2014).
"Side lobe—Wikipedia, the free encyclopedia", http://en.wikipedia.org/wiki/Side_lobe (last visited Jul. 15, 2014).

\* cited by examiner

WIRELESS COMMUNICATION TERMINAL

RELATED APPLICATIONS

This application is a Continuation of U.S. application Ser. No. 14/494,797, filed Sep. 24, 2014, the entire content of which is incorporated herein by reference.

TECHNICAL FIELD

The disclosure relates generally to a wireless communication terminal.

SUMMARY

According to one implementation of the disclosure, an antenna array has a plurality of antenna elements, each of which is configured to apply a phase shift to a signal transmitted by the antenna element. A beam steering controller is configured to steer a main beam of the antenna by controlling the phase shifts applied by the antenna elements. In addition, the beam steering controller is also configured to detect a failure of an antenna element and, in response to detecting the failure, disable the failed antenna element and modify the phase shifts applied by remaining ones of the antenna elements.

According to another implementation of the disclosure, the phase shifts applied by individual ones of the antenna elements of a phased array antenna are controlled to steer a main beam of the antenna in a direction, a determination that one of the antenna elements has failed is made, and, in response, the failed antenna element is disabled and the phase shifts applied by remaining ones of the antenna elements are modified to steer the main beam of the antenna effectively in the same direction.

According to yet another implementation of the disclosure, a wireless communications terminal includes a phased array antenna that has multiple antenna elements and memory storing multiple different beam pointing data structures. Each beam pointing data structure corresponds to a particular combination of enabled and disabled antenna elements of the antenna and stores values that represent phase shifts to be applied by individual ones of the enabled antenna elements for the particular combination to steer the main beam of the antenna in a number of different predetermined directions. The wireless communication terminal also includes a beam steering controller configured to determine a current combination of enabled and disabled antenna elements, select a beam pointing data structure from among the multiple different beam pointing data structures that corresponds to the current combination of enabled and disabled antenna elements, and control phase shifts applied by the currently enabled antenna elements to steer the main beam of the antenna using phase shifts represented in the selected beam pointing data structure.

Other features of the present disclosure will be apparent in view of the following detailed description of the disclosure and the accompanying drawings. Implementations described herein, including the above-described implementations, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompanying drawings.

DETAILED DESCRIPTION

Certain satellite wireless communication systems include terminals (e.g., mobile terminals) that use switched beam antenna arrays to communicate with one or more satellites. Such switched beam antenna arrays may couple a group of active antennas, or antenna elements, to produce a directional radiation pattern that enables the terminal to focus transmission and/or reception of signals in fairly specific directions for communicating with one or more target satellites. A switched beam antenna array may be configured to provide several predefined beam patterns, enabling the terminal to select a particular beam from among the predetermined patterns to use at any given point in time (e.g., depending on the relative position of a satellite with which the terminal is communicating).

In certain implementations, each antenna element may include a transmit/receive module having a power amplifier (e.g., for amplifying signals to be transmitted) and a low-noise amplifier (e.g., for amplifying received signals). If an individual antenna element fails (e.g., the antenna element's transmit/receive module fails due to damage to its power amplifier and/or low noise amplifier), the terminal may disable the failed antenna element and intelligently reconfigure itself to continue operation with the failed antenna element disabled. For example, as described in greater detail below, the terminal may reconfigure the different phase shift values to be applied by the individual antenna elements to enable the switched beam antenna array to continue to offer substantially the same radiation patterns as before the failure of the antenna element or to offer a new set of radiation patterns that are perceived as advantageous in view of the remaining operational antenna elements. Additionally or alternatively, the terminal may change the modulation scheme (e.g., from 16 amplitude and phase-shift keying ("16APSK") to 8 phase-shift keying ("8PSK") or from 8PSK to quadrature phase-shift keying ("QPSK")) used to communicate with a target satellite as appropriate to compensate for the decrease in gain caused by the failure of the antenna element.

Figure 1:
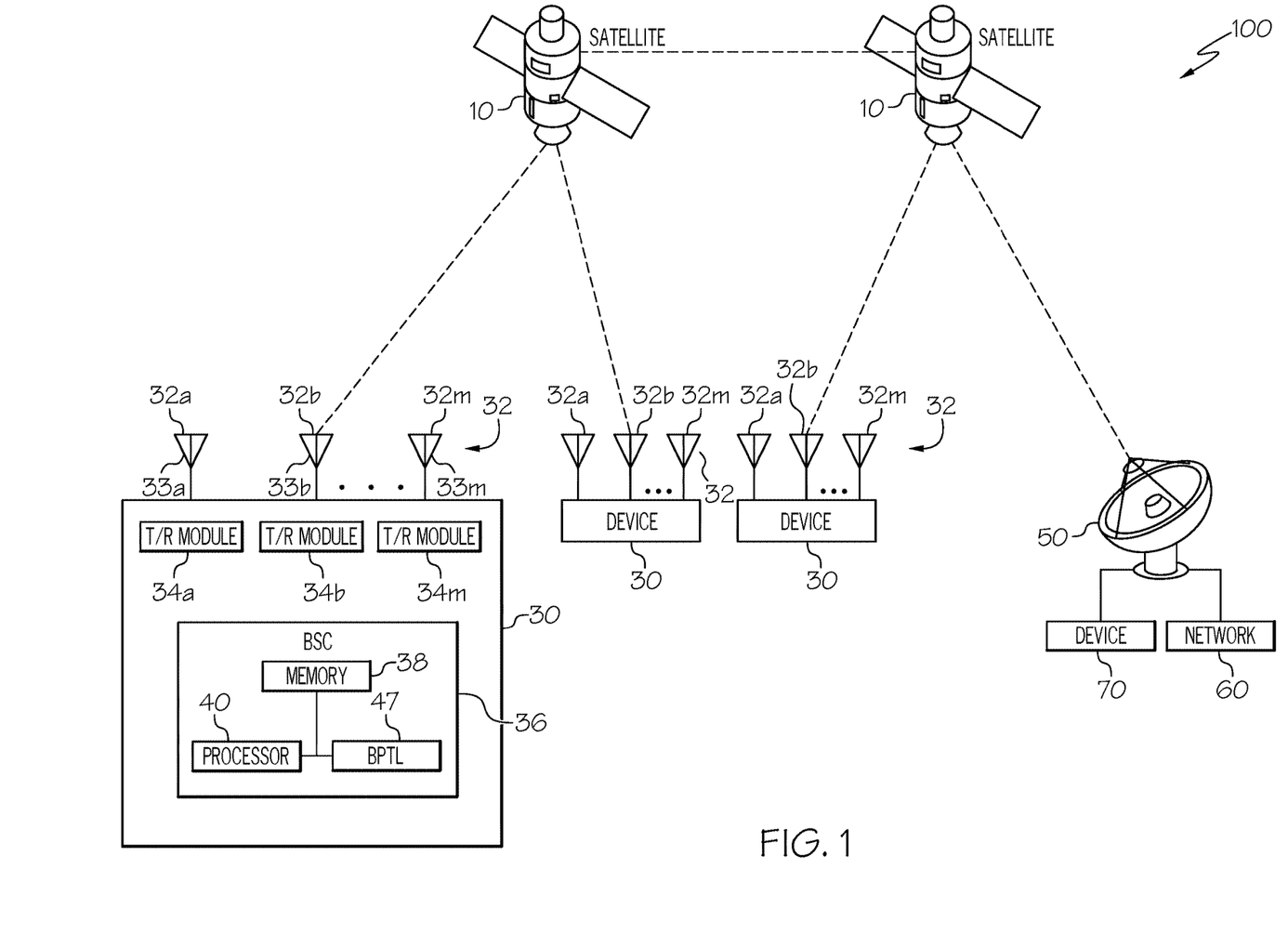
FIG. 1 is a block diagram of a system for wireless communication in accordance with a non-limiting implementation of the present disclosure.

Referring to FIG. 1, a system 100 for wireless communication is illustrated in accordance with a non-limiting implementation of the present disclosure. System 100 includes wireless communication devices 30 each having an antenna array 32 (e.g., a phased array antenna) that includes antenna elements 32a-m. Devices 30 communicate in a wireless communication network that includes cross-linked satellites 10, ground station 50, external network 60 and device 70. For example, devices 30 may be mobile satellite communication terminals mounted on ships and/or aircraft to enable crew, passengers, or equipment on board to engage in wireless communications with remote systems (e.g., via network 60 and/or device 70) and/or other forms of mobile satellite communication devices including satellite telephones/handsets. Devices 30 are configured to communicate with (e.g., transmit signals to and/or receive signals from) satellites 10. Communication signals transmitted from devices 30 to a satellite 10 are relayed from the satellite 10 to ground station 50 (e.g., directly or via satellite crosslinks) and on to a destination such as device 70 or an external network 60. Similarly, communication signals from network 60 or device 70 destined for one of devices 30 may be relayed from ground station 50 through one or more satellites 10 to the intended device 30.

Each antenna element 32$a$-$m$ in a device 30 may include an individual antenna 33$a$-$m$ and a transmit/receive module 34$a$-$m$ that includes one or more of a phase shifter, a power amplifier (e.g., for amplifying output signals), and a low-noise amplifier (e.g., for amplifying received signals). Each device 30 also may include a beam steering controller ("BSC") 36 to steer the main beam(s) of the antenna array 32, for example by controlling the phase shifters of the transmit/receive modules 34$a$-$m$. In certain implementations, the BSC 36 may include memory 38 (e.g., non-volatile memory such as flash, read-only memory ("ROM"), programmable read-only memory ("PROM"), erasable programmable read-only memory ("EPROM"), and electrically erasable programmable read-only memory ("EEPROM") and/or volatile memory such as dynamic random access memory ("DRAM") and static random access memory ("SRAM")), and a processor 40. The BSC 36 also may include one or more beam pointing tables ("BPTs") 47 or similar data structures that store the different phase shift values (e.g., complex weights) to be applied by transmit/receive modules 34$a$-$m$ to achieve each of the predetermined radiation patterns (e.g., predetermined directions of the main beam(s)) of the antenna array 32. In certain implementations, BPTs 47 may be implemented in memory 38.

Each device 30 may be configured to continue to enable communications with satellites 10 even if one or more of the antenna elements 32$a$-$m$ of antenna array 32 fails or otherwise is disabled (e.g., due to damage to one or more of the power amplifier, low noise amplifier, the antenna, etc.). For example, BSC 36 may include multiple different BPTs 47 corresponding to different operational states of antenna array 32 enabling BSC 36 to continue to steer the main beam(s) of antenna array 32 even when one or more antenna elements 32$a$-$m$ fail. More particularly, BSC 36 may include an individual BPT 47 for every possible combination (or each of some subset of possible combinations) of enabled and disabled antenna elements 32$a$-$m$ of antenna array 32 and, when an antenna element fails, that antenna element may be disabled and BSC 36 may use the particular BPT 47 that corresponds to the current combination of enabled and disabled antenna elements to steer the main beam(s) of the antenna array 32.

Additionally or alternatively, device 30 also may be configured to switch the modulation scheme used to communicate with a satellite 10 to accommodate the loss in gain attributable to the failure of one or more antenna elements 32$a$-$m$. For example, the satellites 10 and device 30 may be capable of communicating using multiple different signal constellations, such as, for example, 16APSK, 8PSK, and QPSK, and device 30 may switch from a first signal constellation (e.g., 16APSK) to a second signal constellation that requires a lower signal-to-noise ("SNR") ratio (e.g., 8PSK) responsive to detecting that one or more antenna elements 32$a$-$m$ failed to accommodate the lower gain available due to the failure of the antenna element(s) 32$a$-$m$.

Figure 2:
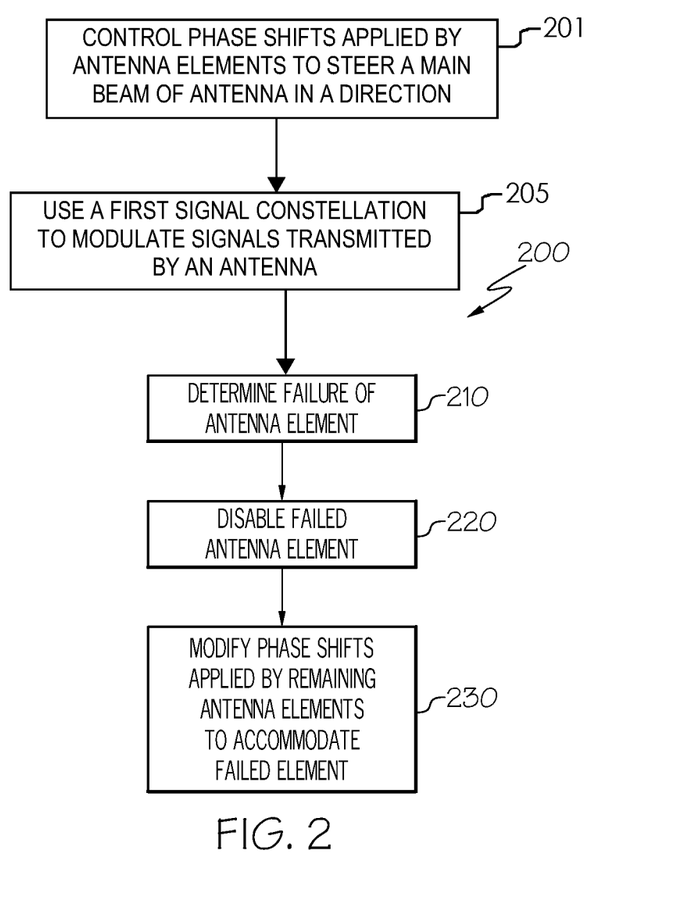
FIG. 2 is a flow chart of a method for operating an antenna array in accordance with a non-limiting implementation of the present disclosure.

Referring to FIG. 2, a method 200 for operating an antenna array (e.g., a phased array antenna) having multiple antenna elements is illustrated in accordance with a non-limiting implementation of the present disclosure. At step 201, phase shifts applied by antenna elements are controlled to steer a main beam of an antenna in a direction. At step 205, a first signal constellation is used to modulate signals transmitted by an antenna. At step 210, failure of one of the antenna elements is detected. In certain implementations, failure of the antenna of the antenna element may be detected. Additionally or alternatively, failure of a power amplifier or other component in the antenna element, such as, for example, a low noise amplifier, an RF switch, etc. may be detected. For example, in order to detect the operational state of a power amplifier, in certain implementations, a power sensor may be coupled to the output of the power amplifier (e.g., using a low level coupler). If the power sensor (operating independently or in connection with additional logic circuitry) determines that the power in a signal output by the power amplifier is below (or has fallen below) a predetermined threshold value, a determination may be made that the power amplifier has failed. Similarly, in order to detect the operational state of a low noise amplifier, in certain implementations, a power sensor may be coupled to the output of the low noise amplifier (e.g., using a low level coupler). If the power sensor (operating independently or in connection with additional logic circuitry) determines that the power in a signal output by the low noise amplifier is below (or has fallen below) a predetermined threshold value, a determination may be made that the low noise amplifier has failed. In certain implementations, similar components and techniques may be employed to detect the failure of other components of an antenna element.

At step 220, the failed antenna element is disabled (or at least partially disabled). In certain implementations, the antenna element may be disabled by applying a predefined impedance to the antenna element. In certain implementations, if the detected failure relates to the failure of the power amplifier of the antenna element, the failed power amplifier is disabled. In such implementation, the antenna element may be disabled from operating in a transmit mode but still may be capable of operating in a receive mode. Thus, the failed antenna element may be said to be only partially disabled.

At step 230, the phase shifts applied by the remaining enabled antenna elements are modified to accommodate the failed antenna element. For example, when the failed antenna element is disabled, the phase shifts applied by the remaining enabled antenna elements may be adjusted in order to maintain the main beam of the antenna in substantially the same direction as it was prior to the failure of the antenna element.

In certain implementations, the phase shifts to be applied by individual antenna elements to steer one or more main beams of the antenna in a number of predetermined directions may be stored in memory in one or more beam pointing tables or similar data structures. The beam pointing table(s) may store phase shift values (or representations of phase shift values) to be applied by individual antenna elements to steer the main beam(s) of the antenna in a number of predetermined directions for each possible combination of enabled and disabled antenna elements in the antenna array. When an antenna element failure is detected, the failed antenna element may be disabled and the current combination of enabled and disabled antenna elements may be determined. A particular beam pointing table then may be selected based on the current combination of enabled and disabled antenna elements. The selected beam pointing table may store phase shift values (or representations of phase shift values) to be applied by each of the remaining enabled antenna elements to steer the main beam(s) of the antenna in a number of predetermined directions.

In implementations in which a failed antenna element is disabled from operating in the transmit mode but remains capable of operating in the receive mode, different beam pointing tables may be selected depending on whether the antenna is transmitting a signal or receiving a signal. In particular, a beam pointing table that corresponds to the current combination of enabled and disabled antenna elements for operating in the transmit mode may be selected when the antenna is transmitting a signal and a different beam pointing table that corresponds to the current combination of enabled and disabled antenna elements for operating in the receive mode may be selected when the antenna is receiving a signal.

Additionally or alternatively, in certain implementations in which the phase shifts to be applied by individual antenna elements are stored in memory in one or more beam pointing tables or similar data structures, a first set of beam pointing tables or similar data structures may store phase shift values (or representations of phase shift values) to be applied by individual antenna elements for each possible combination of enabled and disabled antenna elements in the antenna array when the antenna is operating in the transmit mode and a second set of beam pointing tables or similar data structures may store phase shift values (or representations of phase shift values) to be applied by individual antenna elements for each possible combination of enabled and disabled antenna elements in the antenna array when the antenna is operating in the receive mode. In such implementations, an appropriate beam pointing table or similar data structure will be selected from among the first set or second set depending on whether the antenna is transmitting a signal or receiving a signal.

In certain implementations, a BSC may control the phase shifts applied by the remaining enabled antenna elements according to the selected beam pointing table.

Figure 3:
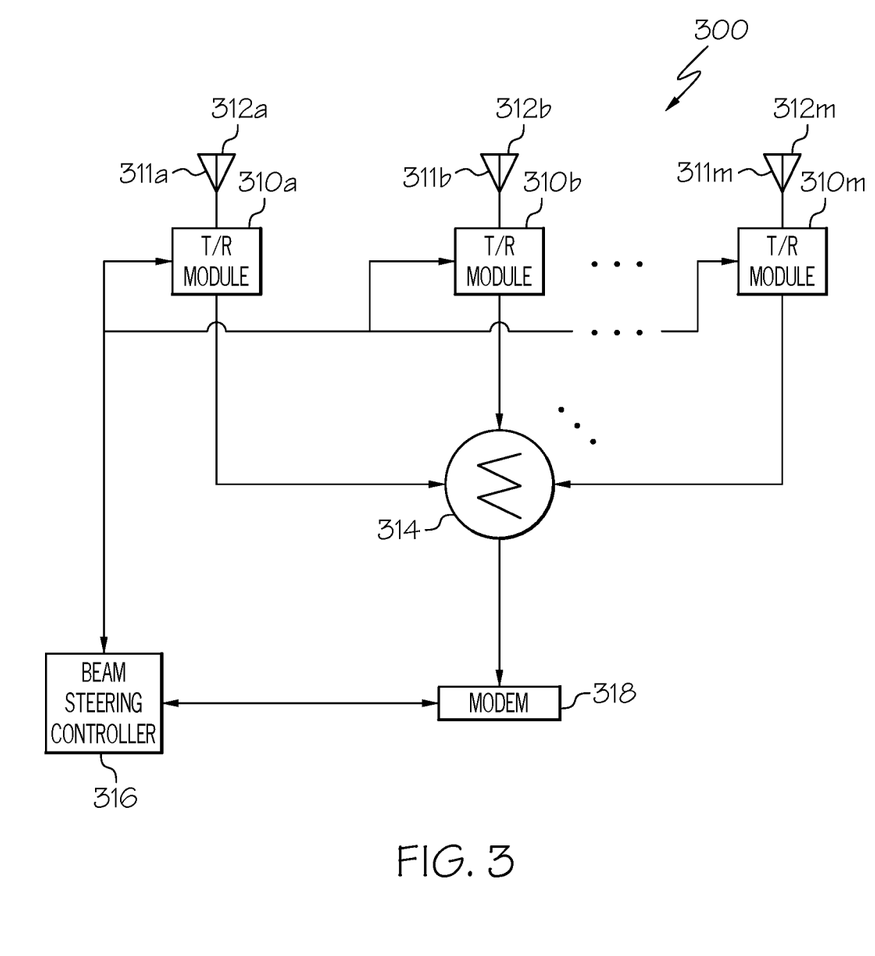
FIG. 3 is a block diagram of a wireless communication terminal in accordance with a non-limiting implementation of the present disclosure.

With reference to FIG. 3, a wireless communication terminal 300 is illustrated in accordance with a non-limiting implementation of the present disclosure. Wireless communication terminal 300 may correspond to one of devices 30 illustrated in FIG. 1.

An antenna array (e.g., a phased array antenna) has antenna elements 312a-m, each of which includes a transmit/receive module 310a-m and an antenna 311a-m. Each transmit receive module 310a-m is connected to a radio-frequency ("RF") summing junction 314 which is connected to a modem 318.

When the wireless communication terminal 300 is receiving, variants of a signal (e.g., phase-shifted variants) are received by the antennas 311a-m of the antenna elements 312a-m and then processed by the corresponding transmit/receive modules 310a-m of the antenna elements 312a-m. For example, the transmit/receive modules 310a-m may apply phase shifts to the received variants of the signal. The transmit/receive modules 310a-m also may amplify the received variants of the signal (e.g., using low noise amplifiers incorporated within the transmit/receive modules 310a-m). The processed signals then are combined by the RF summing junction 314 and the resultant signal is transmitted to the modem 318 for further processing (e.g., demodulation) and use by the wireless communication terminal.

When the wireless communication terminal 300 is transmitting, the signal to be transmitted is modulated by modem 318 and then transmitted to the RF summing junction 314. The RF summing junction splits the signal and transmits it to the transmit/receive modules 310a-m of the antenna elements 312a-m. The transmit/receive modules 310a-m of the antenna elements 312a-m then process the signals before they are transmitted by the corresponding antennas 311a-m of the antenna elements 312a-m. For example, the transmit/receive modules 310a-m may apply phase sifts to the signals. The transmit/receive modules 310a-m also may amplify the signals (e.g., using power amplifiers incorporated within the transmit/receive modules 310a-m).

A BSC 316 is connected to each transmit/receive module 310a-m as well as modem 318. BSC 316 may control the phase shifts applied by each transmit/receive module 310a-m to steer the main beam(s) of the antenna array in a number of predetermined directions. The BSC 316 may receive input from modem 318 (e.g., based on signals received by the wireless communication terminal) that guides the BSC's 316 selection of the direction in which to steer the main beam(s) of the antenna array at a particular point in time.

Figure 4:
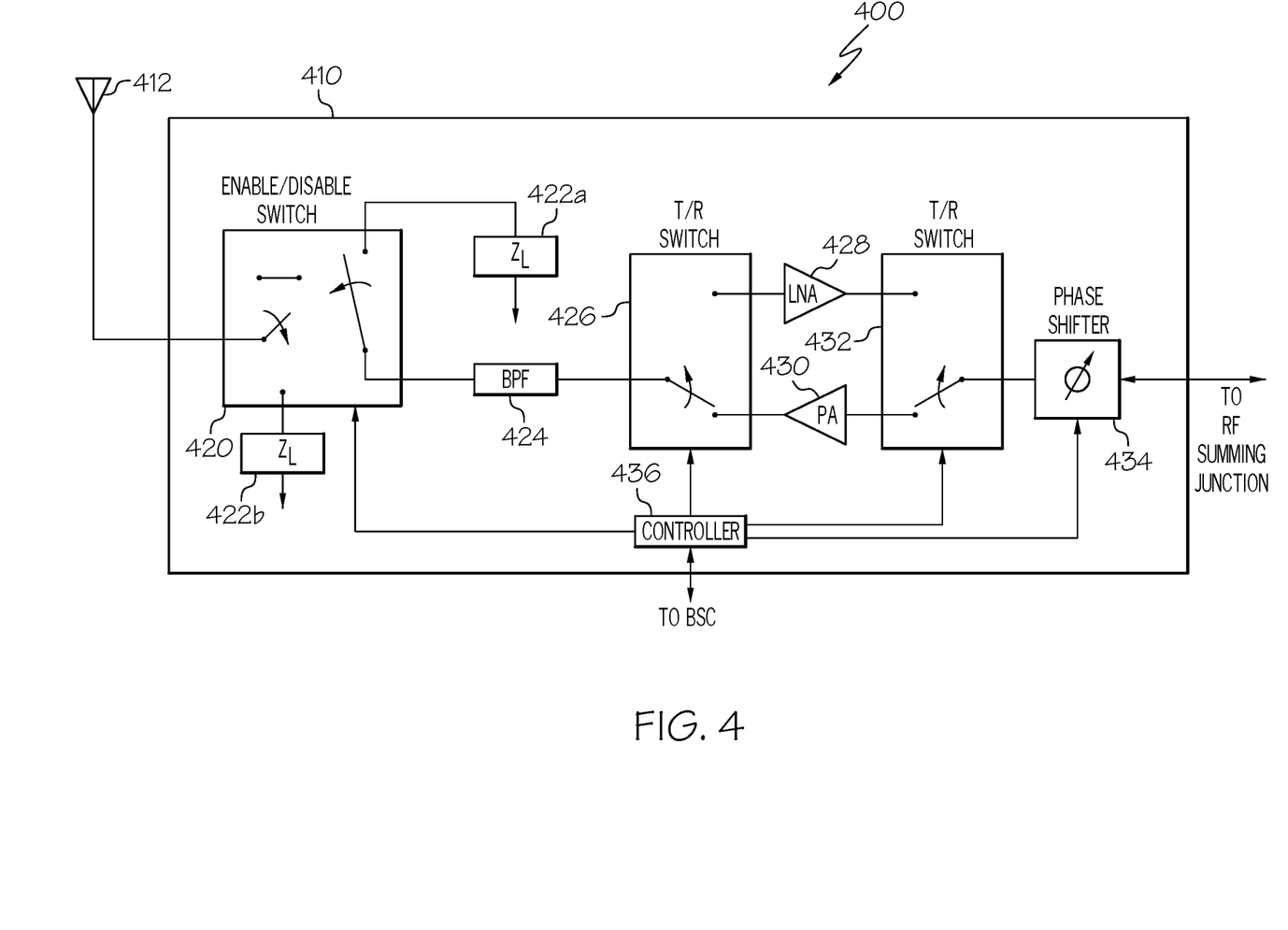
FIG. 4 is a block diagram of an antenna element from a wireless communication terminal in accordance with a non-limiting implementation of the present disclosure.

With reference to FIG. 4, an antenna element 400 from a wireless communication terminal having an antenna array (e.g., a phased array antenna) is illustrated in accordance with a non-limiting implementation of the present disclosure. Antenna element 400 may correspond to one of the antenna elements 32a-m illustrated in FIG. 1 or one of the antenna elements 312a-m illustrated in FIG. 3.

Antenna element 400 includes a transmit/receive module 410 and an antenna 412. Transmit/receive module 410 includes an enable/disable switch 420, a band pass filter ("BPF") 424, transmit/receive switches 426 and 432, a low noise amplifier 428, a power amplifier 430, a phase shifter 434, and a controller 436. In addition, transmit/receive module 410 is connected to a BSC (not shown) and an RF summing junction (not shown). In some implementations, controller 436 may be implemented as a field programmable gate array (FPGA). Alternatively, in other implementations, controller 436 may be implemented as a microprocessor.

Enable/disable switch 420 may be configured to enable antenna element 400 to be switched from being enabled to transmit and/or receive signals to disabled from transmitting and/or receiving signals (e.g., in response to detection of a failure of antenna element 400 or one of its components) and vice versa. Enable/disable switch 420 is controlled by controller 436. When the antenna element 400 is enabled, controller 436 controls enable/disable switch 420 to provide a signal path between antenna 412 and phase shifter 434, thereby enabling antenna element 400 to transmit and/or receive signals. In contrast, when the antenna element 400 is disabled, controller 436 controls enable/disable switch 420 to switch so that a known impedance 422a and 422b is applied to both the antenna 412 and the transmit/receive module 410, thereby disabling antenna element 400 from transmitting and/or receiving signals. In some implementations, enable/disable switch 420 may be a mechanical switch. Alternatively, in other implementations, enable/disable switch 420 may be an electronic switch.

Antenna element 400 is configured to operate in one or both of a transmit mode and a receive mode. When operated in the transmit mode, antenna element 400 transmits a signal and, when operated in the receive mode, antenna element 400 receives a signal. Transmit/receive switches 426 and 432 (which, for example, may be implemented as mechanical or electronic switches) enable transmit/receive module 400 to switch between operating in the transmit mode and the receive mode and are controlled by signals received from controller 436.

When transmit/receive module 410 is operated in the transmit mode, controller 436 (which itself may be controlled by the BSC) causes transmit/receive switches 426 and 432 to switch to provide a signal path from the RF summing junction to antenna 412 through phase shifter 434, power amplifier 430, and BPF 424. Phase shifter 434 applies a phase shift to the signal received from the RF summing junction. After the phase shift has been applied to the signal, power amplifier 430 amplifies the signal. Finally, BPF 424 filters out components of the amplified signal that are outside of the frequency band(s) in which antenna element 400 is configured to transmit signals before the signal is passed to antenna 412 and transmitted. In certain implementations, BPF 424 may be implemented as a surface acoustic wave (SAW) filter. Additionally or alternatively, BPF 424 may be implemented using a variety of electronic circuit elements (e.g., one or more resistors, inductors, capacitors, and/or operational amplifiers, etc.).

When transmit/receive module 410 is operated in the receive mode, controller 436 (which itself may be controlled by the BSC) causes transmit/receive switches 426 and 432 to switch to provide a signal path from antenna 412 to the RF summing junction through BPF 424, low noise amplifier 428, and phase shifter 434. BPF 424 filters out components of the signal received by antenna 412 that are outside of the frequency band(s) in which antenna element 400 is configured to receive signals. Low noise amplifier 428 then amplifies the received signal. After the signal has been amplified, phase shifter 434 applies a phase shift to the signal and passes the phase shifted signal to the RF summing junction, where, for example, it is combined with signals from other antenna elements (not shown) of the wireless communication terminal.

The phase shifts applied by phase shifter 434 to signals transmitted and/or received by antenna element 400 are controlled by controller 436, which in turn is controlled by the BSC. In this manner, the BSC controls the phase shifts applied by all of the antenna elements of the wireless communication terminal in order to steer the main beam(s) of the antenna array to different positions. In certain implementations, phase shifter 434 may change the phase shift applied to a signal by changing the length of the transmission line across which the signal travels.

Figure 5:
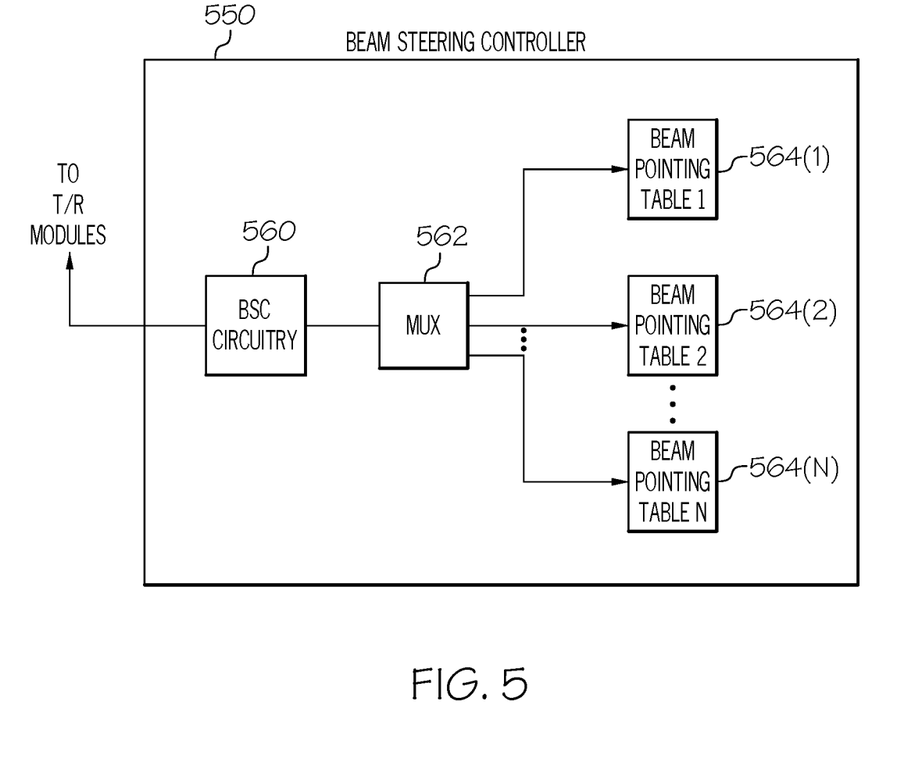
FIG. 5 is a block diagram of a beam steering controller from a wireless communication terminal in accordance with a non-limiting implementation of the present disclosure.

With reference to FIG. 5, a beam steering controller 550 from a wireless communication terminal (not shown) having an array of antenna elements (e.g., a phased array antenna) (not shown) is illustrated in accordance with a non-limiting implementation of the present disclosure. BSC 550 may correspond to BSC 36 illustrated in FIG. 1 or BSC 316 illustrated in FIG. 3 and/or be connected to transmit/receive module 410 illustrated in FIG. 4.

BSC 550 includes BSC circuitry 560, a multiplexer 562, and multiple beam pointing tables 564(1)-(N) and is connected to the transmit/receive modules (not shown) of the antenna elements of the wireless communication terminal. Among other functions, BSC 550 is configured to control individual antenna elements to steer the main beam(s) of the antenna array in a number of predetermined directions. In particular, BSC 550 may set the phase shifts (e.g., complex weights) to be applied by the phase shifters of the transmit/receive modules of individual antenna elements to signals transmitted and/or received by the antenna elements in order to steer the main beam(s) of the antenna array in a number of predetermined directions. In certain implementations, BSC may be implemented as a microprocessor or another form of digital logic circuitry.

Different beam pointing tables 564(1)-(N) correspond to different combinations of enabled and disabled elements of the antenna array. The antenna array may include some number, m, antenna elements. Over time, one or more of those m antenna elements may fail and, as described above, be disabled. Therefore, the beam pointing tables 564(1)-(N) store values representing the phase shifts to be applied by different antenna elements depending on the particular combination of antenna elements that actually are enabled and disabled. For example, beam pointing table 564(1) may store values representing the phase shifts to be applied by all of the antenna elements in order to steer the main beam(s) of the antenna array in each of a number of predetermined directions while all m antenna elements remain enabled. Similarly, beam pointing table 564(2) may store values representing the phase shifts to be applied by the enabled antenna elements to steer the main beam(s) of the antenna array in each of a number of predetermined directions when one of the antenna elements has been disabled and some configuration of m-1 antenna elements remain enabled, and so on and so forth. In some implementations, BSC 550 may maintain beam pointing tables 564(1)-564(N) for every possible combination of enabled and disabled antenna elements. In other implementations, BSC 550 may maintain beam pointing tables 564(1)-564(N) for only some limited subset of the possible combinations of enabled and disabled antenna elements.

BSC circuitry 560 is configured to determine which antenna elements from the antenna array currently are enabled and to select, using multiplexer 562, the particular beam pointing table from among the multiple beam pointing tables 564(1)-564(N) that corresponds to the particular combination of currently enabled and disabled antenna elements. BSC circuitry 560 then accesses the phase shift values for the currently enabled antenna elements stored in the selected beam pointing table and uses the accessed phased shift values to control the phase shifts applied by the transmit/receive modules of the enabled antenna elements to steer the main beam(s) of the antenna array in a number of predetermined directions.

In certain implementations, a calibration process may be performed (e.g., during manufacture, shortly after installation/initial use, and/or at different intervals following installation/initial use) to determine the phase shifts to be applied by the antenna elements to steer the main beam(s) of the antenna in a number of different directions for each of various different combinations of enabled and disabled antenna elements. Values representing these phase shifts then may be stored in beam pointing tables corresponding to the different combinations of enabled and disabled antenna elements.

For example, in a wireless communication terminal with an antenna array having three antenna elements, x, y, and z, a calibration process may be performed to determine phase shifts to be applied by individual antenna elements to steer the main beam(s) of the antenna array in a number of different directions for each possible combination of enabled and disabled antenna elements. Corresponding beam pointing tables then may be populated with phase shift values for each possible combination of enabled and disabled antenna elements. In particular, in this example, beam pointing tables corresponding to the following possible combinations of enabled and disabled antenna elements may be populated with phase shift values determined during the calibration process:

(1) antenna elements x, y and z all enabled;
(2) antenna element x disabled and antenna elements y and z enabled;
(3) antenna elements x and y disabled and antenna element z enabled;
(4) antenna elements x and z disabled and antenna element y enabled;
(5) antenna element y disabled and antenna elements x and z enabled;
(6) antenna elements y and z disabled and antenna element x enabled; and
(7) antenna element z disabled and antenna elements x and y enabled.

In certain implementations, different beam pointing tables may be used depending on whether the wireless communication terminal is transmitting or receiving. For example, a first set of beam pointing tables may store values representing the phase shifts to be applied by different antenna elements depending on the particular combination of antenna elements that actually are enabled and disabled when the wireless communication terminal is transmitting and a second set of beam pointing tables may store values representing the phase shifts to be applied by different antenna elements depending on the particular combination of antenna elements that actually are enabled and disabled when the wireless communication terminal is receiving. Such implementations may be employed when the wireless communication terminal is configured to enable individual antenna elements to be disabled from transmitting but not receiving and vice versa.

Although the beam pointing tables generally have been described above as being implemented as individual tables corresponding to particular combinations of enabled and disabled antenna elements, the information stored in the beam pointing tables also may be stored in a single table and/or in a variety of other data structures or configurations.

In certain implementations, the wireless communication terminal may be configured to be able to communicate (e.g., transmit and/or receive signals) using a variety of different modulation schemes (e.g., different signal constellations). For example, in one particular implementation, the wireless communication terminal may be configured to communicate using any of 16APSK, 8PSK, and QPSK. Use of 16APSK may enable greater data transfer rates than use of 8PSK or QPSK, but 16APSK also may require a higher signal-to-noise ratio than 8PSK or QPSK. Similarly, use of 8PSK may enable greater data transfer rates than use of QPSK, but 8PSK also may require a high signal-to-noise ratio than QPSK. Consequently, as individual antenna elements fail and the overall gain of the antenna array decreases as a result, the wireless communication terminal may not be capable of achieving the signal-to-noise ratio necessary to enable use of a higher data rate modulation scheme. Therefore, in addition to adjusting the phase shifts to be applied by individual antenna elements to accommodate the failure of one or more antenna elements, the wireless communication terminal also may adjust the modulation scheme used as antenna elements fail in order to accommodate the failed antenna element(s) (e.g., based on a determination that the remaining enabled antenna elements are incapable of providing the signal-to-noise ratio needed to support the current modulation scheme).

Additionally or alternatively, in certain implementations, when an antenna element fails, the wireless communication terminal may be capable of detecting the particular component(s) of the antenna element that failed. In such implementations, if the power amplifier or some other element along the transmit path of an antenna element fails but the receive path of the antenna element remains operational, the wireless communication terminal may disable the antenna element from transmitting signals while still enabling the antenna element to receive signals. In such cases, when the wireless communication terminal is transmitting signals, the wireless communication terminal may select a beam pointing table that corresponds to the combination of antenna elements currently enabled and disabled for transmitting signals and, when the wireless communication terminal is receiving signals, the wireless communication terminal may select a different beam pointing table that corresponds to the combination of antenna elements currently enabled and disabled for receiving signals.

The teachings of the present disclosure may be applicable to any wireless communication terminal having an antenna array with multiple antenna elements and may enable such a wireless communication terminal to continue communicating (e.g., transmitting and/or receiving signals) notwithstanding a failure of one or more of the antenna elements of the antenna array. Although specific examples described above may be described in the context of mobile satellite communication terminals, the teachings of the present disclosure are more broadly applicable and may be employed in any type of wireless communication terminal having an antenna array with multiple antenna elements.

Aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of such a computer-readable storage medium include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including object oriented programming languages, dynamic programming languages, and/or procedural programming languages.

The flowchart and block diagrams in the figures illustrate examples of the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order illustrated in the figure(s). For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. Machine-readable, non-transitory storage media storing instructions for operating a phased array antenna having multiple antenna elements that, when executed by one or more processing elements, cause the one or more processing elements to:
   control phase shifts applied by individual ones of the antenna elements to steer a main beam of the antenna in a direction;
   use a first signal constellation to modulate signals transmitted by the antenna;
   determine that one of the antenna elements has failed;
   in response to determining that the antenna element has failed:
      disable the failed antenna element,
      modify the phase shifts applied by remaining ones of the antenna elements to steer the main beam of the antenna effectively in the same direction, and
      use a second signal constellation that is different from the first signal constellation to modulate signals transmitted by the antenna.

2. A method of operating a phased array antenna that includes multiple antenna elements and that is configured to operate in both a transmit mode and a receive mode, the method comprising:
   storing, in machine-readable memory, multiple different beam pointing data structures, each beam pointing data structure:
      corresponding to a particular combination of enabled and disabled antenna elements of the antenna, and
      storing values representing phase shifts to be applied by individual ones of the enabled antenna elements for the particular combination to steer the main beam of the antenna in a number of different predetermined directions;
   determining a first current combination of enabled and disabled antenna elements for operating the phased array antenna in the transmit mode;
   selecting a transmitting beam pointing data structure from among the multiple different beam pointing data structures that corresponds to the first current combination of enabled and disabled antenna elements for operating the phased array antenna in the transmit mode;
   controlling phase shifts applied by the currently enabled antenna elements of the first current combination of enabled and disabled antenna elements when the phased array antenna is operating in the transmit mode to steer the main beam of the antenna using phase shifts represented in the selected transmitting beam pointing data structure;
   determining a second current combination of enabled and disabled antenna elements for operating the phased array antenna in the receive mode;
   selecting a receiving beam pointing data structure from among the multiple different beam pointing data structures that corresponds to the second current combination of enabled and disabled antenna elements for operating the phased array antenna in the receive mode;
   controlling phase shifts applied by the currently enabled antenna elements of the second current combination of enabled and disabled antenna elements when the phased array antenna is operating in the receive mode to steer the main beam of the antenna using phase shifts represented in the selected receiving beam pointing data structure;
   detecting that a power amplifier of a particular antenna element has failed;
   disabling the particular antenna element from operating in the transmit mode as a consequence of detecting that the power amplifier of the antenna element has failed;
   after disabling the particular antenna element from operating in the transmit mode:
      determining an updated combination of enabled and disabled antenna elements for operating the phased array antenna in the transmit mode based on having disabled the particular antenna element from operating in the transmit mode, selecting a new transmitting beam pointing data structure from among the multiple different beam pointing data structures that corresponds to the updated combination of enabled and disabled antenna elements for operating the phased array antenna in the transmit mode, and controlling phase shifts applied by the currently enabled antenna elements of the new combination of enabled and disabled antenna elements when the phased array antenna is operating in the transmit mode to steer the main beam of the antenna using phase shifts represented in the selected new transmitting beam pointing data structure.

3. Machine-readable, non-transitory storage media storing instructions for operating a phased array antenna that includes multiple antenna elements and that is configured to operate in both a transmit mode and a receive mode that, when executed by one or more processing elements, cause the one or more processing elements to:

determine a first current combination of enabled and disabled antenna elements for operating the phased array antenna in the transmit mode;

select a transmitting beam pointing data structure from among multiple different beam pointing data structures stored in machine readable memory, wherein:
  each of the multiple beam pointing data structures:
    corresponds to a particular combination of enabled and disabled antenna elements of the antenna, and
    stores values representing phase shifts to be applied by individual ones of the enabled antenna elements for the particular combination to steer the main beam of the antenna in a number of different predetermined directions, and
  the selected transmitting beam pointing data structure corresponds to the first current combination of enabled and disabled antenna elements for operating the phased array antenna in the transmit mode;

control phase shifts applied by the currently enabled antenna elements of the first current combination of enabled and disabled antenna elements when the phased array antenna is operating in the transmit mode to steer the main beam of the antenna using phase shifts represented in the selected transmitting beam pointing data structure;

determine a second current combination of enabled and disabled antenna elements for operating the phased array antenna in the receive mode;

select a receiving beam pointing data structure from among the multiple different beam pointing data structures that corresponds to the second current combination of enabled and disabled antenna elements for operating the phased array antenna in the receive mode;

control phase shifts applied by the currently enabled antenna elements of the second current combination of enabled and disabled antenna elements when the phased array antenna is operating in the receive mode to steer the main beam of the antenna using phase shifts represented in the selected receiving beam pointing data structure;

detect that a power amplifier of a particular antenna element has failed;

disable the particular antenna element from operating in the transmit mode as a consequence of having detected that the power amplifier of the antenna element has failed;

after disabling the particular antenna element from operating in the transmit mode:
  determine an updated combination of enabled and disabled antenna elements for operating the phased array antenna in the transmit mode based on having disabled the particular antenna element from operating in the transmit mode,
  select a new transmitting beam pointing data structure from among the multiple different beam pointing data structures that corresponds to the updated combination of enabled and disabled antenna elements for operating the phased array antenna in the transmit mode, and
  control phase shifts applied by the currently enabled antenna elements of the new combination of enabled and disabled antenna elements when the phased array antenna is operating in the transmit mode to steer the main beam of the antenna using phase shifts represented in the selected new transmitting beam pointing data structure.

4. Machine readable, non-transitory storage media storing instructions for operating a phased array antenna having multiple antenna elements that, when executed by one or more processing elements, cause the one or more processing elements to:

read phase shifts to be applied to individual antenna elements from a first beam pointing table;

control the individual antenna elements to apply the corresponding phase shifts read from the first beam pointing table to steer a main beam of the antenna in a direction;

determine that one of the antenna elements has failed; and in response to determining that the antenna element has failed:
  disable the failed antenna element,
  read modified phase shifts to be applied by remaining ones of the antenna elements from a second beam pointing table that is different from the first beam pointing table, and
  control individual remaining antenna elements to apply the corresponding modified phase shifts read from the second beam pointing table to steer the main beam of the antenna effectively in the same direction.

5. A wireless communication terminal, comprising:

a phased array antenna having multiple antenna elements;

memory storing multiple different beam pointing data structures, each beam pointing data structure:
  corresponding to a particular combination of functioning and failed antenna elements of the antenna, and
  storing values representing phase shifts to be applied by individual ones of the functioning antenna elements for the particular combination to steer the main beam of the antenna in a number of different predetermined directions; and a beam steering controller configured to:
  determine a current combination of functioning and failed antenna elements,
  select a beam pointing data structure from among the multiple different beam pointing data structures that corresponds to the current combination of functioning and failed antenna elements, and
  control phase shifts applied by the currently functioning antenna elements to steer the main beam of the antenna using phase shifts represented in the selected beam pointing data structure.

6. A method of operating a phased array antenna that includes multiple antenna elements, the method comprising:

storing, in machine-readable memory, multiple different beam pointing data structures, each beam pointing data structure:
corresponding to a particular combination of functioning and failed antenna elements of the antenna, and
storing values representing phase shifts to be applied by individual ones of the functioning antenna elements for the particular combination to steer the main beam of the antenna in a number of different predetermined directions;
determining a current combination of functioning and failed antenna elements;
selecting a beam pointing data structure from among the multiple different beam pointing data structures that corresponds to the current combination of functioning and failed antenna elements; and
controlling phase shifts applied by the currently functioning antenna elements to steer the main beam of the antenna using phase shifts represented in the selected beam pointing data structure.

7. Machine-readable, non-transitory storage media storing instructions for operating a phased array antenna having multiple antenna elements that, when executed by one or more processing elements, cause the one or more processing elements to:
determine a current combination of functioning and failed antenna elements;
select a beam pointing data structure from among multiple different beam pointing data structures stored in machine-readable memory, wherein:
each beam pointing data structure:
corresponds to a particular combination of functioning and failed antenna elements of the antenna, and
stores values representing phase shifts to be applied by individual ones of the functioning antenna elements for the particular combination to steer the main beam of the antenna in a number of different predetermined directions, and
the selected beam pointing data structure corresponds to the current combination of functioning and failed antenna elements; and
control phase shifts applied by the currently functioning antenna elements to steer the main beam of the antenna using phase shifts represented in the selected beam pointing data structure.

8. An antenna system for a wireless communications terminal comprising:
a plurality of antenna elements, individual antenna elements being configured to operate in a transmit mode and a receive mode; and
a control unit configured to:
determine a set of receive phase shifts for steering a beam of the antenna system,
cause individual antenna elements to apply corresponding phase shifts from the set of receive phase shifts to signals they receive when operating in the receive mode,
determine a set of transmit phase shifts for steering a beam of the antenna system,
cause individual antenna elements to apply corresponding phase shifts from the set of transmit phase shifts to signals they transmit when operating in the transmit mode,
detect a failure of a power amplifier of a particular antenna element,
as a consequence of having detected the failure of the power amplifier of the particular antenna element:
disable the particular antenna element from operating in the transmit mode,
determine a new set of transmit phase shifts for steering the beam of the antenna system that accounts for the particular antenna element being disabled from operating in the transmit mode, and
cause individual antenna elements to apply corresponding phase shifts from the new set of transmit phase shifts when operating in the transmit mode.

9. An antenna system for a wireless communications terminal comprising:
a plurality of antenna elements, each of which is configured to apply a phase shift to a signal transmitted by the antenna element; and
a control unit configured to:
read phase shifts to be applied by individual antenna elements from a first beam pointing table,
cause individual antenna elements to apply corresponding ones of the phase shifts read from the first beam pointing table to signals they transmit,
detect a failure of a particular antenna element, and
as a consequence of having detected the failure of the particular antenna element:
read phase shifts to be applied by individual antenna elements other than the particular antenna element from a second beam pointing table, and
cause individual antenna elements other than the particular antenna element to apply corresponding ones of the phase shifts read from the second beam pointing table to signals they transmit.

10. An antenna system for a wireless communications terminal comprising:
a plurality of antenna elements; and
a control unit configured to:
detect a failure of an antenna element, and as a consequence of detecting the failure of the antenna element, cause the antenna system to switch from using a first modulation scheme to a second modulation scheme; and
wherein causing the antenna system to switch from using a first modulation scheme to a second modulation scheme comprises causing the antenna system to switch from using a first signal constellation to using a different signal constellation.

11. An antenna system for a wireless communications terminal comprising:
a plurality of antenna elements; and
a control unit configured to:
detect a failure of an antenna element, and as a consequence of detecting the failure of the antenna element, cause the antenna system to switch from using a first modulation scheme to a second modulation scheme; and
further comprising, as a consequence of detecting the failure of the antenna element, cause the antenna system to adjust the phase shift to be applied to others of the plurality of antenna elements.

12. An antenna system for a wireless communications terminal comprising:
a plurality of antenna elements; and
a control unit configured to:
detect a failure of an antenna element, and as a consequence of detecting the failure of the antenna element, cause the antenna system to switch from using a first modulation scheme to a second modulation scheme; and wherein causing the antenna system to switch from using a first modulation scheme to a second modulation scheme comprises causing the antenna system to switch from using a first amplitude and phase-shift keying scheme to a different amplitude and phase-shift keying scheme.

* * * * *